United States Patent [19]

Jorgensen et al.

[11] Patent Number: 5,408,045

[45] Date of Patent: Apr. 18, 1995

[54] ELECTRICAL BOX ASSEMBLY WITH MOUNTING BRACKET

[75] Inventors: Robert W. Jorgensen, Niles, Mich.; Thomas E. Lewis, South Bend, Ind.; Richard D. Swanson, Niles Berrien, Mich.

[73] Assignee: Hubbell Incorporated, Orange, Conn.

[21] Appl. No.: 995,820

[22] Filed: Dec. 23, 1992

Related U.S. Application Data

[63] Continuation-in-part of Ser. No. 819,295, Jan. 10, 1992, abandoned.

[51] Int. Cl.⁶ .............................................. H02G 3/12
[52] U.S. Cl. ........................................ 174/58; 174/48; 220/3.9
[58] Field of Search ..................... 174/48, 58; 220/3.9, 220/3.92; 248/228, 300, 906

[56] References Cited

U.S. PATENT DOCUMENTS

| | | | |
|---|---|---|---|
| 1,705,768 | 3/1929 | Johnson et al. | |
| 3,474,994 | 10/1969 | Swanquist | 248/205 |
| 3,537,698 | 11/1970 | Callanan | 269/98 |
| 3,588,019 | 6/1971 | Cozeck | 248/228 |
| 3,701,448 | 10/1972 | Vadnais | 220/3.9 |
| 3,720,395 | 3/1973 | Schuplin | 220/3.9 X |
| 3,730,466 | 5/1973 | Swanquist | 248/216 |
| 3,780,209 | 12/1973 | Schuplin | 174/51 |
| 3,977,640 | 8/1976 | Arnold et al. | 220/3.9 X |
| 4,062,470 | 12/1977 | Boteler | 220/3.3 |
| 4,135,337 | 1/1979 | Medlin | 52/221 |
| 4,140,293 | 2/1979 | Hansen | 248/217.2 |
| 4,176,258 | 12/1979 | Glick | 220/3.3 |
| 4,447,030 | 5/1984 | Nattel | 248/27.1 |
| 4,747,506 | 5/1988 | Stuchlik, III | 220/3.9 |
| 4,880,128 | 11/1989 | Jorgensen | 220/3.9 |
| 4,892,211 | 1/1990 | Jorgensen | 220/3.2 |
| 4,971,280 | 11/1990 | Rinderer | 248/906 X |
| 5,004,199 | 4/1991 | Suk | 220/3.9 X |
| 5,025,944 | 6/1991 | Rodick | 220/3.9 |

*Primary Examiner*—Leo P. Picard
*Assistant Examiner*—David Tone
*Attorney, Agent, or Firm*—Jerry M. Presson; David L. Tarnoff

[57] ABSTRACT

An electrical box assembly including an electrical box and a mounting bracket rigidly coupled to the box for mounting the box onto a support member, such as a stud or a joist. The mounting bracket includes a base portion and a pair of leg portions resiliently coupled to the base portion to form a substantially U-shaped, three-sided bracket. The mounting bracket has inwardly extending arms for resiliently gripping the support member. The arms of the mounting bracket grip onto either side of a metal or wood support member to secure the electrical box to the support member and prevent relative movement between the electrical box and the support member. In one embodiment, the arms include teeth to improve the grip between the mounting bracket and a wood support member. In another embodiment, the mounting bracket is coupled to the box by clamping tabs.

45 Claims, 7 Drawing Sheets

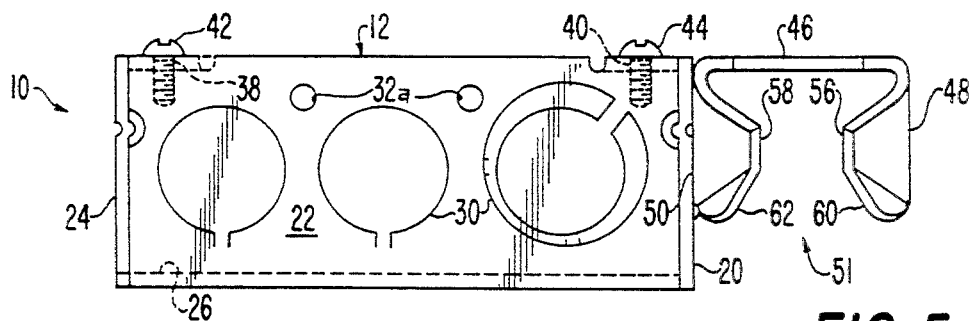
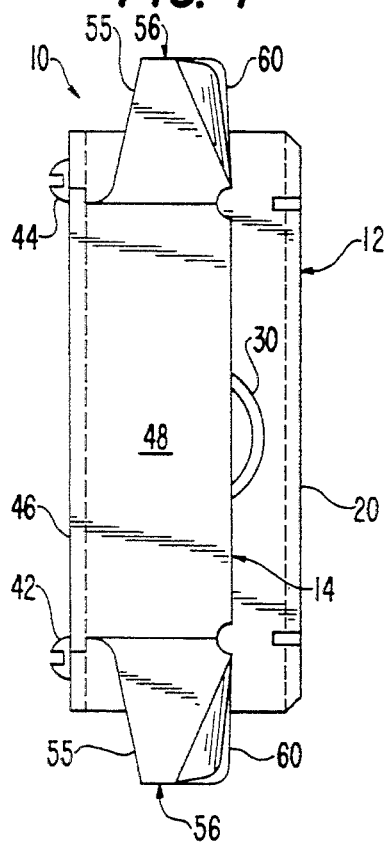
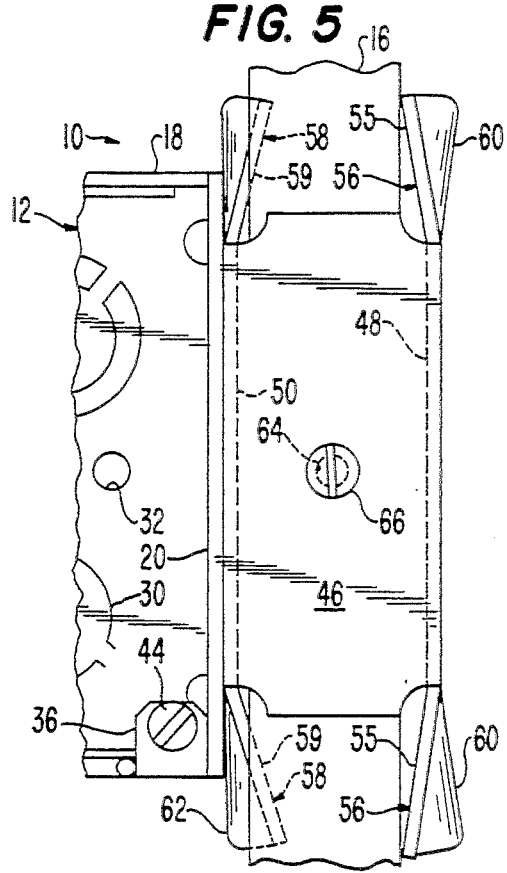
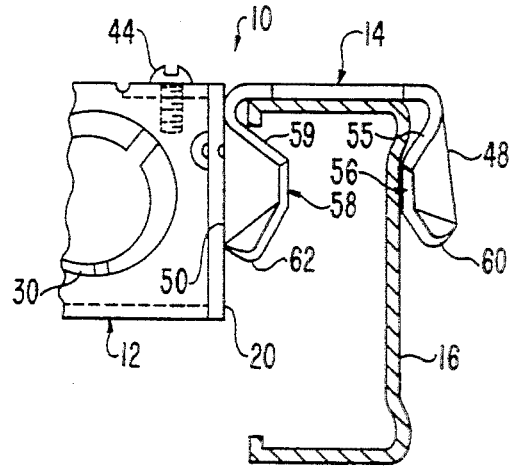

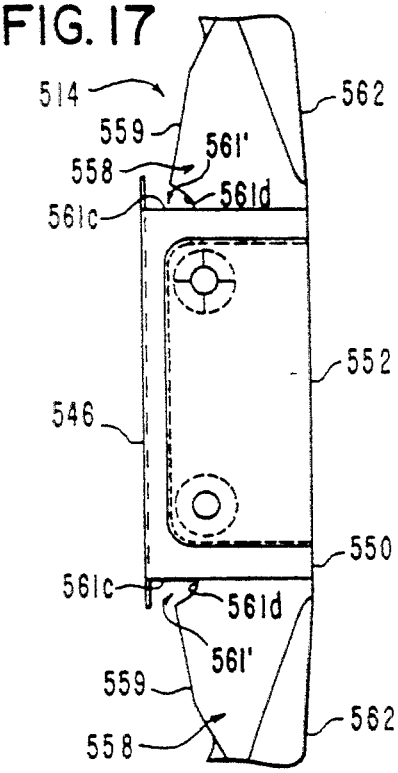
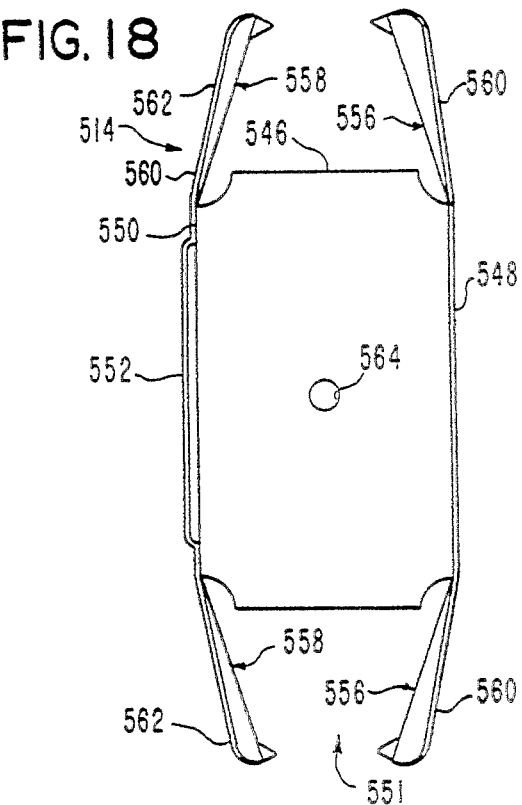
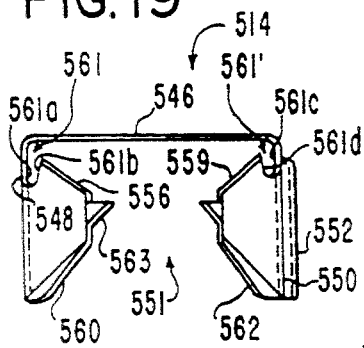
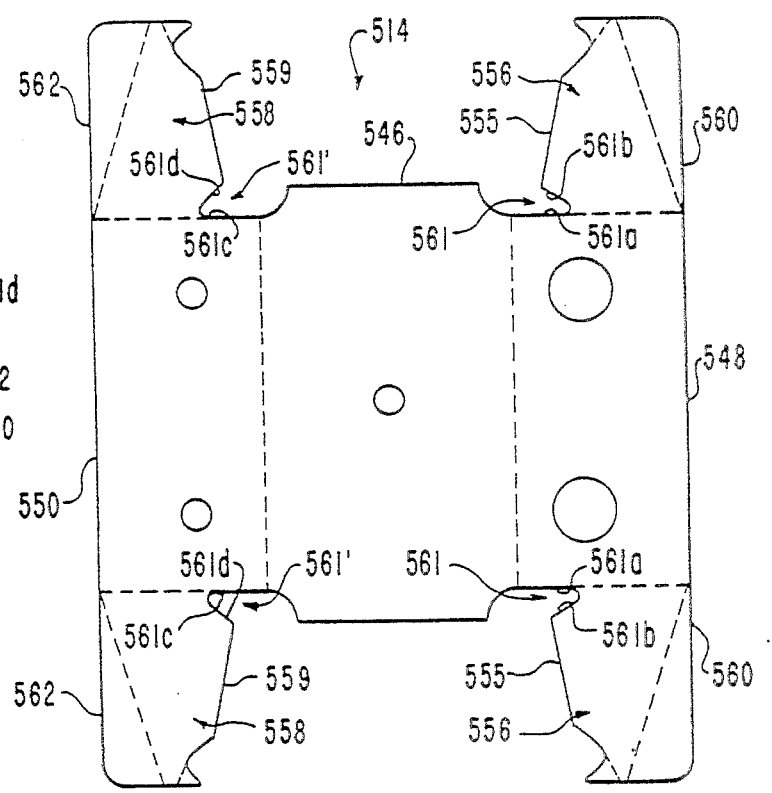

ELECTRICAL BOX ASSEMBLY WITH MOUNTING BRACKET

RELATED PATENT APPLICATION

This application is a continuation-in-part application of U.S. patent application Ser. No. 07/819,295, filed on Jan. 10, 1992, now abandoned.

FIELD OF THE INVENTION

This invention relates to an electrical box assembly with a mounting bracket for coupling the electrical box assembly to a support member. More specifically, the invention relates to a mounting bracket having inwardly angled arms for resiliently gripping a stud or joist.

BACKGROUND OF THE INVENTION

Presently, most buildings are constructed with interior walls and floors using either metal or wood support members, i.e., studs or joists, for their frames. Typically, electrical boxes are mounted on these metal or wood support members.

Numerous mounting arrangements are known in the prior art for mounting an electrical box to a metal or wood stud.

Due to the substantial differences between metal and wood support members, most mounting arrangements are designed for use with either a metal support member or a wood support member, but typically not both. Although, some mounting arrangements have been developed that can be used on both metal and wood support members. However, these mounting arrangements have several disadvantages.

For example, U.S. Pat. No. 3,474,994 to Swanquist discloses an electrical box mounting clip having a pair of grippers that lock into the inturned flanges on the open side of a metal stud. Disadvantages of the Swanquist box mounting clip are that it cannot be mounted onto either side of the metal stud, it can only be affixed onto the open side of the metal stud, and the box mounting clip will not lock onto a wood stud.

Another disadvantage of some prior mounting arrangements is that they require holding the box to the support member, then affixing the bracket to the support member with a fastener such as a screw or nail. Therefore, two hands are needed to mount an electrical box onto a support member. Other prior mounting arrangements do not securely grip the support member.

Examples of some prior electrical boxes with mounting arrangements are disclosed in the following U.S. Pat. Nos. 1,705,768 to Johnson et al; 3,537,698 to Callanan et al; 3,588,019 to Cozeck et al; 3,701,448 to Vadnais; 3,730,466 to Swanquist; 3,780,209 to Schuplin; 4,062,470 to Boteler; 4,135,337 to Medlin; 4,140,293 to Hansen; 4,176,758 to Glick; 4,447,030 to Nattel; 4,747,506 to Stuchlik, III; 4,880,128 to Jorgensen; 4,892,211 to Jorgensen; and 5,025,944 to Rodick.

Thus, there exists a need to provide an improved electrical box assembly with a mounting bracket which can be used with either metal or wood support members, and is relatively easy to install. This invention addresses this need in the art, along with other needs which will become apparent to those skilled in the art once given this disclosure.

SUMMARY OF THE INVENTION

Accordingly, a primary object of the invention is to provide a mounting bracket coupled to an electrical box for mounting the electrical box on a support member by resiliently gripping a support member in such a manner as to prevent relative movement between the electrical box and the support member.

Another object of the invention is to provide a mounting bracket with inwardly angled arms which will grip a support member of any depth and prevent vertical movement of the electrical box along the support member.

Another object of the invention is to provide a mounting bracket which will grip on either side of a support member.

A further object of the invention is to provide a mounting bracket which can be used with either metal or wood support members.

A further object of the invention is to provide a mounting bracket which can be quickly and easily installed onto a support member.

A further object of the invention is to provide a mounting bracket which is relatively inexpensive to manufacture.

A further object of the invention is to provide a mounting bracket that can be mounted on studs or support members with any size depth.

A further object of the invention is to provide a mounting bracket that does not require a separate fastener to secure it to either a metal or wood stud.

The foregoing objects are basically attained by providing an electrical box assembly for mounting to a support member, the combination comprising: an electrical housing; a substantially U-shaped bracket for supporting the housing on the support member, the bracket including a substantially flat base portion, a first leg portion coupled substantially perpendicular to the base portion, a second leg portion coupled substantially perpendicularly to the base portion to form a space for receiving the support member between the first and second leg portions, and a first pair of arms coupled to opposite ends of the first leg portion and angled inwardly into the space formed by the first and second leg portions for gripping the support member, a second pair of arms coupled to opposite ends of the second leg portion and angled inwardly into the space formed by the first and second leg portions for gripping the support member; and coupling elements for fixedly coupling the bracket to the housing.

The foregoing objects are also attained by providing a mounting bracket assembly adapted to be coupled to an electrical box and mounted on a support member, the combination comprising a substantially flat base portion; a first leg portion coupled substantially perpendicularly to the base portion, the first leg portion having an inwardly facing surface with a gripping portion lying in a first plane and an outwardly facing surface; a second leg portion coupled substantially perpendicularly to the base portion to form a space with the base portion and the leg portion for receiving a support member between the first and second leg portions, a first arm coupled to one end of the first leg portion for resiliently gripping the support member, the first arm having a gripping portion lying in a second plane substantially parallel to the first plane forming a first slot between the first and second planes of the gripping portions for receiving a flange of the support member therein; and coupling means for rigidly coupling the bracket to an electrical box.

The foregoing objects are further attained by providing a mounting bracket assembly adapted to be coupled to an electrical box and mounted on a support member, the combination comprising a substantially flat base portion with an inwardly facing surface lying in a first plane for contacting the support surface, a first leg portion coupled substantially perpendicularly to the base portion, a second leg portion coupled substantially perpendicularly to the base to form a space with the base portion and the first leg portion for receiving a support member between the first and second leg portions, a first arm coupled to one end of the first leg portion for resiliently gripping the support member, the first arm having a gripping portion lying in a second plane to form a first slot between the first and second planes for receiving and gripping a flange of the support member, and coupling member for rigidly coupling the bracket to an electrical box.

Other objects, advantages and salient features of the invention will become apparent from the following detailed description, which, taken in conjunction with the annexed drawings discloses several embodiments of the invention.

BRIEF DESCRIPTION OF THE DRAWINGS

Referring now to the drawings which form part of this original disclosure:

FIG. 3 is a bottom plan view of the electrical box assembly with mounting bracket shown in FIGS. 1 and 2;

FIG. 4 is a right side elevational view of the electrical box assembly with mounting bracket shown in FIGS. 1-3;

FIG. 5 is a partial, front elevational view of the electrical box assembly with mounting bracket shown in FIGS. 1-4 mounted on a conventional metal stud;

FIG. 6 is a partial, bottom plan view of the electrical box assembly with mounting bracket shown in FIGS. 1-5 mounted on a conventional metal stud;

FIG. 17 is a side elevational view of a sixth mounting bracket adapted to be coupled to an electrical box;

FIG. 18 is a back elevational view of the mounting bracket shown in FIG. 17;

FIG. 19 is a bottom end view of the mounting bracket of FIGS. 17 and 18;

FIG. 20 is a top plan view of the mounting bracket of FIGS. 17-19 prior to bending;

DETAILED DESCRIPTION OF THE INVENTION

Figure 1:
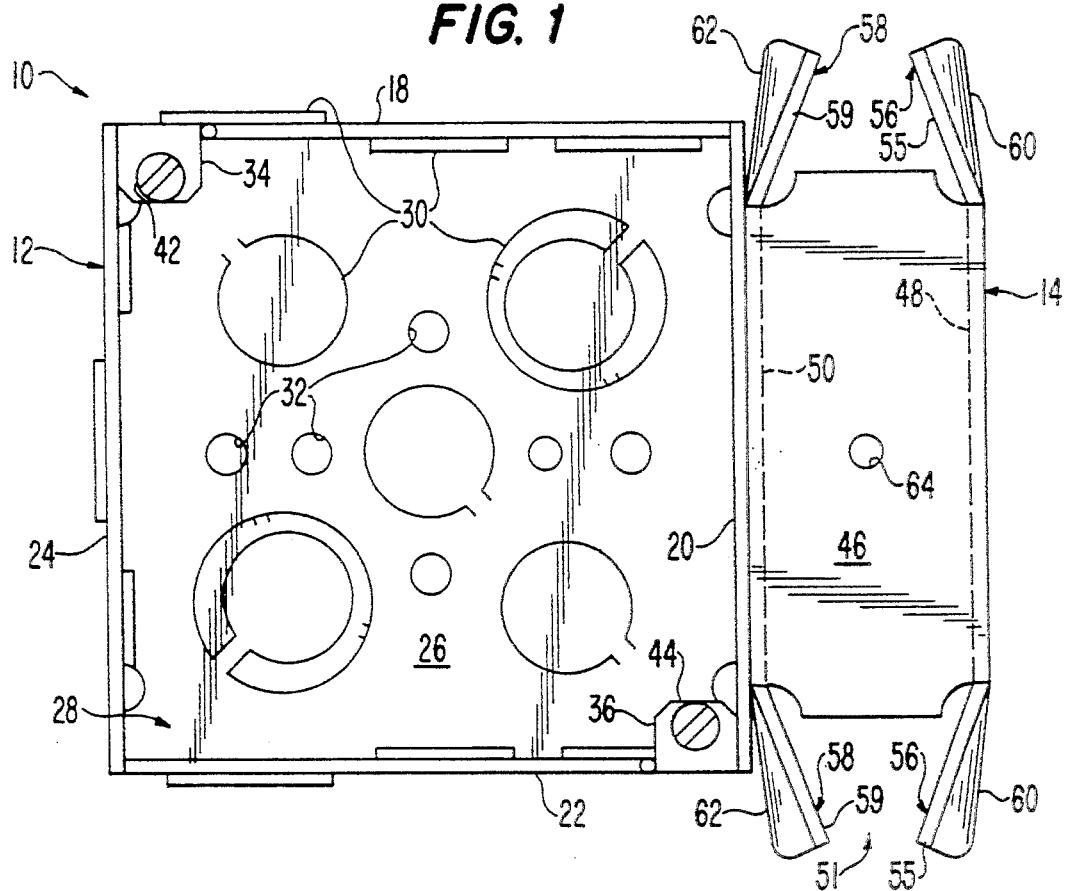
FIG. 1 is a front elevational view of a first embodiment of an electrical box assembly with mounting bracket in accordance with the present invention.
Figure 2:
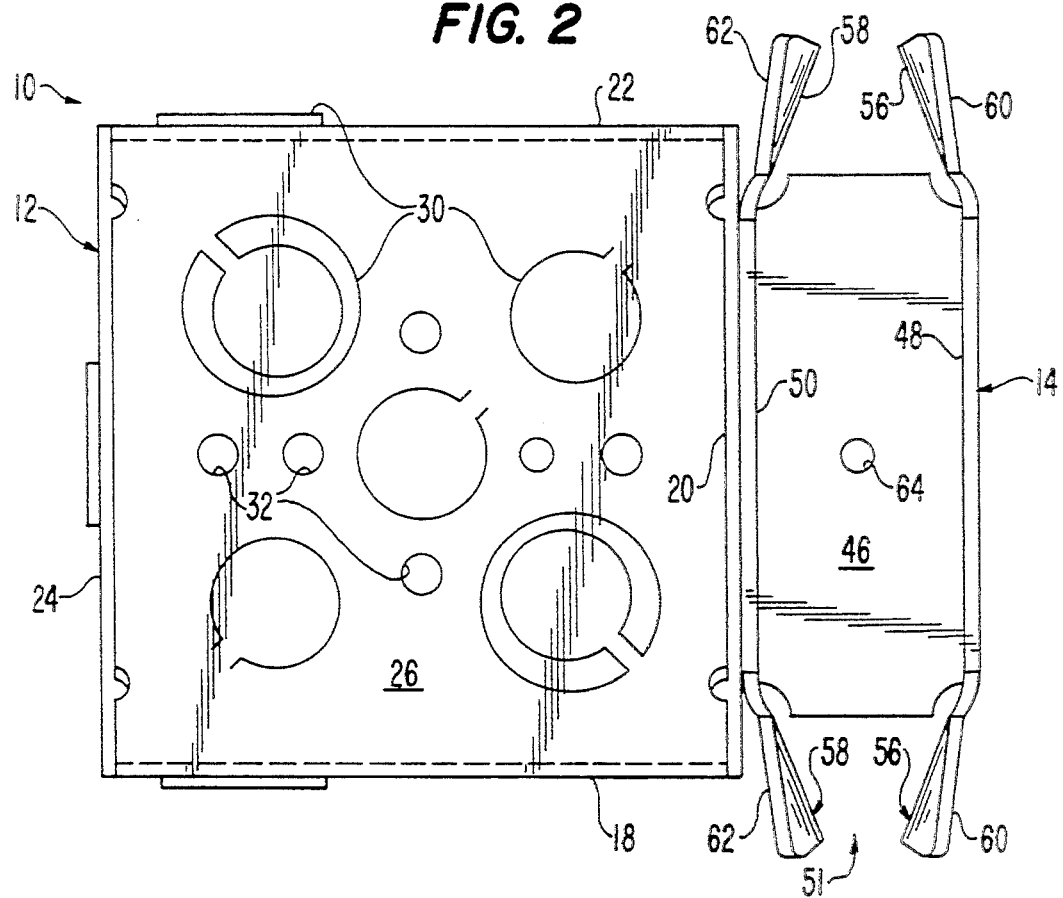
FIG. 2 is a back elevational view of the electrical box assembly with mounting bracket shown in FIG. 1.

As seen in FIGS. 1, 2 and 6, an electrical box assembly 10 in accordance with a first embodiment of the present invention is illustrated, and includes a housing 12 in the form of a wall or junction box, and a mounting bracket 14 rigidly coupled to housing 12. The mounting bracket 14 resiliently grips a metal stud or support member for fixedly coupling housing 12 to stud 16.

Housing 12 has four substantially planar side walls 18, 20, 22 and 24, and a rear wall 26. Rear wall 26 and side walls 18, 20, 22 and 24 are rigidly coupled together to form a substantially rectangular box with a top opening 28 for receiving an electrical wiring device therein. While housing 12 is shown as a square box, it could also be a round, polygonal, or other shaped box.

Housing 12 is preferably formed as a one-piece member from a conventional metallic material, such as galvanized steel or aluminum. Alternatively, housing 12 can be formed as a one-piece, unitary, integrally molded member from a suitable non-metallic material, such as a thermoplastic or thermoset composition.

As particularly seen in FIGS. 1-3, housing 12 has a plurality of break-out windows 30 and auxiliary holes 32 and 32a. Break-out windows 30 can be removed as necessary to install electrical wires into housing 12. Auxiliary holes 32 and 32a can be either used to support housing 12 to a support member with conventional fasteners (not shown). Auxiliary holes 32 in rear wall 26 can be used to attach an electrical box support thereto as described in U.S. Pat. No. 4,898,357 to Jorgensen et al.

Additionally, side walls 18 and 22 have inwardly extending flanges 34 and 36 with threaded holes 38 and 40, respectively. Threaded holes 38 and 40 threadedly receive screws 42 and 44, respectively, for fastening an electrical wiring device (not shown) or a cover (not shown) to housing 12.

Mounting bracket 14 is preferably formed as a one-piece, unitary member from spring steel or any other suitable resilient material. Alternatively, mounting bracket 14 can be formed as a one-piece, unitary, integrally molded member from a suitable non-metallic material, such as thermoplastic.

Figure 7:
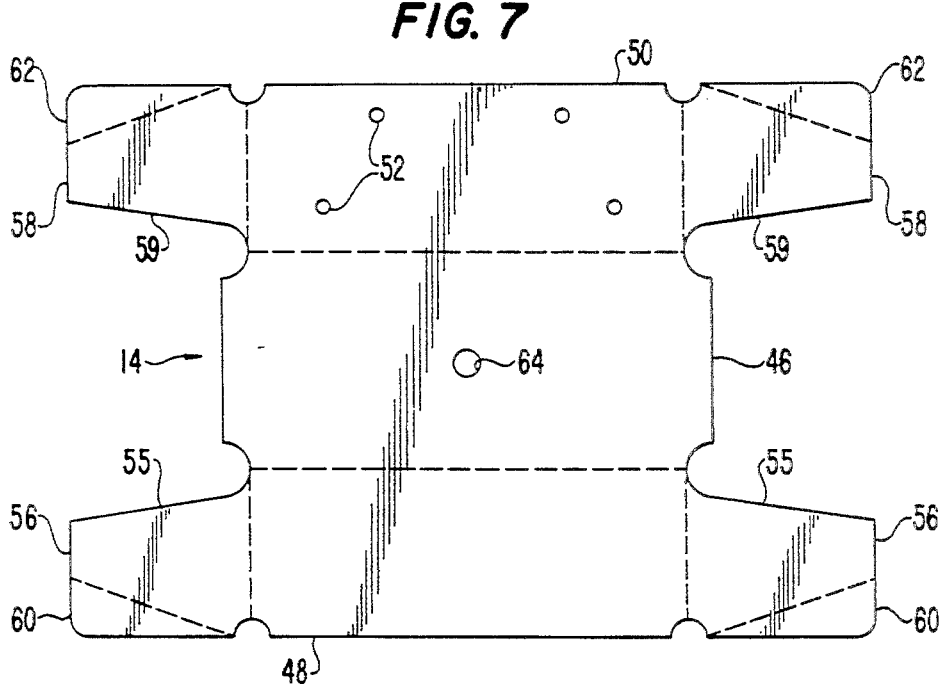
FIG. 7 is a top plan view of the mounting bracket of FIGS. 1-6 prior to bending.

Housing 12 is preferably fixedly and rigidly coupled to mounting bracket 14 by welding, as seen in FIGS. 1–6, or riveting. As particularly seen in FIG. 3, mounting bracket 14 is substantially U-shaped with a base portion 46, a first leg portion 48, and a second leg portion 50. Preferably, mounting bracket 14 is formed by stamping a piece of sheet metal into a blank, as seen in FIG. 7, and then bending the blank along the broken lines to its final shape as seen in FIGS. 1–6.

Base portion 46 is a substantially flat, rectangular plate with a centrally located mounting or pilot hole 64 and with its four corners removed. Leg portions 48 and 50 extend substantially perpendicularly from the two long sides of base portion 46. Accordingly, leg portions 48 and 50 are substantially parallel to each other and form a space 51 therebetween for receiving support member 16. Preferably, the distance between leg portions 48 and 50 is approximately 1½ inches to accommodate either metal or wood support members, i.e., studs or joists.

Leg portions 48 and 50 are substantially identical, except that second leg portion 50 has four embosses 52 and is a mirror image of first leg portion 48.

As seen in FIG. 4, first leg portion 48 is a substantially flat, rectangular plate with its four corners removed. An inwardly angled arm 56 extends from each of the short ends of first leg portion 48 inwardly into space 51. Each of the inwardly angled arms 56 has upper edge 55 and an outwardly extending wing 60 along the lower portion of arm 56.

Second leg portion 50 is a substantially flat, rectangular plate with its four corners removed. An inwardly angled arm 58 extends from each of the short ends of second leg portion 50 inwardly into space 51. Each of the inwardly angled arms 58 has an upper edge 59 and an outwardly extending wing 62 along the lower portion of arm 58.

As seen in FIGS. 5 and 6, each of the upper edges 59 is angled downwardly away from second leg portion 50 to form a wedge-shaped space between the plane of base portion 46 and the respective upper edge 59. These wedge-shaped spaces are sized to receive a portion of metal stud 16. Upper edges 59 engage metal stud 16 to prevent any relative movement therebetween. In particular, edges 59 will dig into the metal stud 16 upon attempting longitudinal movement of bracket 14 along stud 16. Contact between edges 59 and metal stud 16 is maintained by first leg portion 48 which pulls edges 59 into contact with stud 16 due to the resiliency of bracket 14.

Similarly, upper edges 55 are angled downwardly away from first leg portion 48 to form wedge-shaped spaces between the plane of the base portion 46 and upper edges 55. These wedge-shaped spaces are sized to receive a portion of metal stud 16 when box 10 is mounted on the opposite side of stud 16 from that seen in FIGS. 5 and 6. Upper edges 55 will engage metal stud 16 to prevent any relative movement therebetween. In particular, edges 55 will dig into the metal stud 16 upon attempting longitudinal movement of bracket 14 along stud 16. Contact between edges 55 and metal stud 16 will be maintained by the second leg portion 50 which pulls edges 55 into contact with stud 16 due to the resiliency of bracket 14.

As seen in FIGS. 5 and 6, first leg portion 48 and second leg portion 50 are resiliently coupled to the base portion 46 to exert pressure on stud 16 for securely gripping stud 16. This pressure is accomplished by ensuring that the space between the free ends of arms 56 and 58 is less than the cross-sectional thickness of metal stud 16.

Alternatively, bracket 14 can be used by a wood stud or joist. Upon mounting bracket 14 on a wood stud or joist, inwardly angled arms 56 and 58 will resiliently grip the wood stud or joist. Arms 56 and 58 prevent longitudinal movement of box 10 along the stud or joist, since the free end edge will dig into the wood upon attempting longitudinal movement.

As specifically seen in FIGS. 1 and 5, outwardly extending wings 60 and 62, respectively, extend outwardly at an angle of approximately 30° from each of the inwardly angled arms. Outwardly extending wings 60 and 62 serve as ramps to bias leg portions 48 and 50 outwardly along with arms 56 and 58 to receive metal stud 16 into space 51.

Second leg portion 50 is rigidly coupled to side wall 20. As seen in FIG. 7, second leg portion 50 has four embosses 52, which aid in welding the mounting bracket 14 to housing 12.

As seen in FIG. 5, pilot hole 64 is located in the center of base portion 46 and can receive an optional mounting screw 66 or other suitable fastener. The head of optional mounting screw 66 is slightly larger than pilot hole 64 to further secure mounting bracket 14 to metal stud 16, if desired.

Installation

To install the electrical box assembly 10, mounting bracket 14 is pressed by one hand either onto side of metal stud 16, as seen in FIGS. 5 and 6, or onto a wood stud (not shown). The outwardly extending wings 60 and 62 serve as ramps to bias leg portions 48 and 50 outwardly, upon engaging metal stud 16. Thus, the mounting bracket 12 is easily snapped onto metal stud 16. Inwardly angled arms 56 and 58 resiliently grip the metal stud 16 to secure a tight fit between bracket 14 and metal stud 16. In particular, inwardly extending arms 56 and 58 engage the metal stud 16 to prevent any relative movement between the box 10 and the stud 16.

Figure 8:
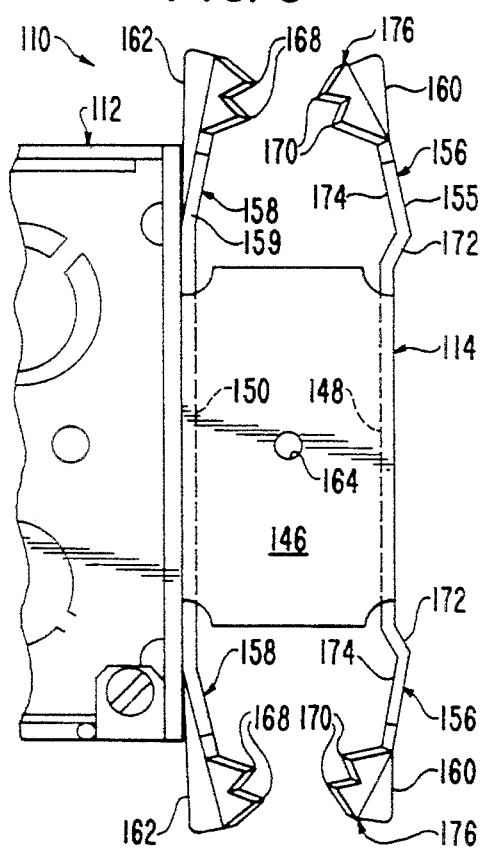
FIG. 8 is a partial, front elevational view of a second embodiment of an electrical box assembly with mounting bracket.
Figure 9:
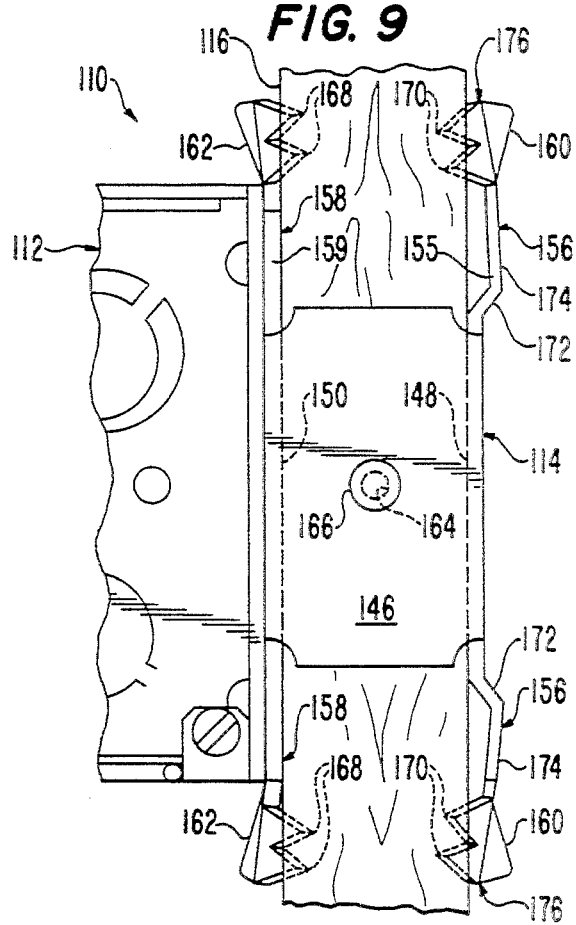
FIG. 9 is a partial, front elevational view of the electrical box assembly with mounting bracket as shown in FIG. 8, mounted to a conventional wood stud.

Second Embodiment of FIGS. 8 and 9

Referring now to FIGS. 8 and 9, an electrical box assembly 110 is illustrated in accordance with a second embodiment of the present invention, and includes a housing 112 rigidly coupled to a mounting bracket 114.

Housing 112 is substantially identical to housing 12 as shown in FIGS. 1 and 2. Therefore, housing 112 will not be discussed or illustrated in detail.

Mounting bracket 114 is substantially U-shaped with a base portion 146, a first leg portion 148 with arms 156, and a second leg portion 150 with arms 158.

Mounting bracket 114 is substantially identical to mounting bracket 14 illustrated in FIGS. 1–6, except that the arms 156 and 158 of mounting bracket 114 have been modified to improve gripping of a wood stud as discussed below. Therefore, mounting bracket 114 will not be discussed in detail.

Located at both ends of first leg portion 148 are the inwardly angled arms 156. Each of the arms 156 includes a first arm portion 172, a second arm portion 174, and a third arm portion 176.

The first arm portion 172 extends outwardly at an angle of approximately 45° from the end of first leg portion 148. The second arm portion 174 extends inwardly at an angle of approximately 30° from first arm portion 172. The third arm portion 176 is preferably angled slightly inwardly from second arm portion 174.

The lower portion of each of the third arm portions 176 has an outwardly extending wing 160, which extends outwardly at an angle of approximately 30° from the respective third arm portion 176. The upper portion of each of the third arm portions 176 has an edge 155 with a pair of inwardly angled gripping teeth 170.

Located at opposite ends of second leg portion 150 are the inwardly angled arms 158. The lower portion of each of the inwardly angled arms 158 has an outwardly extending wing 162, which extends outwardly at an angle of approximately 30° from the respective inwardly angled arm 158. The upper portion of each of the inwardly angled arms 158 has an edge 159 with an inwardly angled pair of gripping teeth 168 for gripping the wood stud 116.

As seen in FIG. 9, inwardly angled gripping teeth 168 and 170 slightly penetrate the wood stud 116, thereby insuring a secure fit. For the purpose of illustration, the penetration of gripping teeth 168 and 170 into the wood stud 116 has been exaggerated.

Gripping teeth 168 and 170 are sufficient by themselves to securely fasten the mounting bracket 214 to the wood stud 116. However, mounting bracket 214 may be further secured to the wood stud by an optional nail, if desired. In particular, a mounting or pilot hole 164 is located in the center of second member 148 and can receive an optional nail 166 or other suitable fastener. The head of nail 166 is slightly larger than mounting hole 164 to further secure mounting bracket 114 to wood stud 116, if desired.

When bracket 114 is mounted on a metal support member, edges 155 or 159 will engage the metal support member in substantially the same manner as edges 55 and 59 of bracket 14 engage stud 16 discussed above. Accordingly, bracket 114 can be used with either metal or wood support members.

Figure 10:
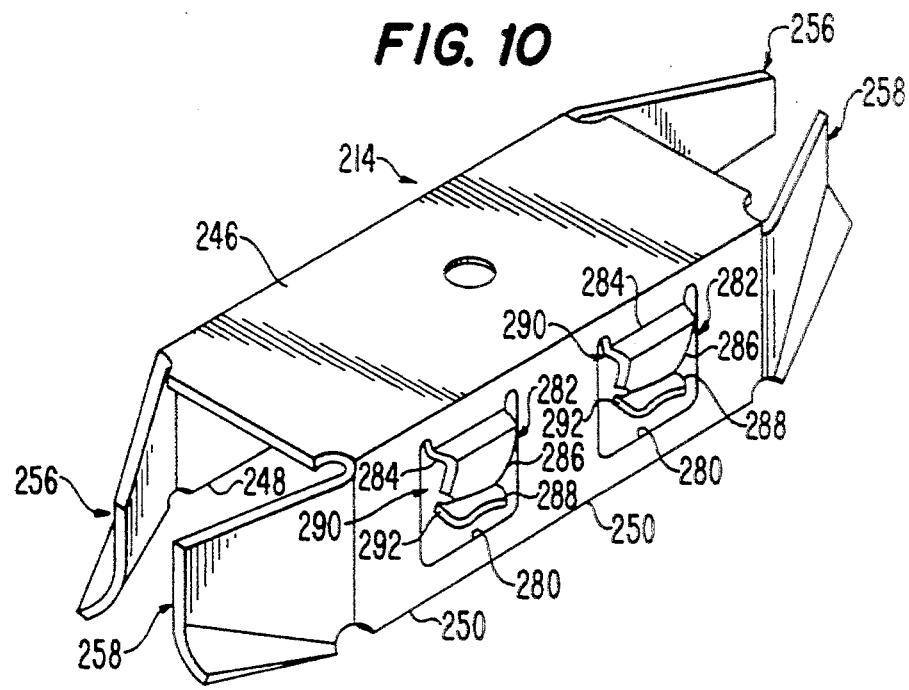
FIG. 10 is a perspective view of a third embodiment of mounting bracket adapted to be coupled to an electrical box.
Figure 11:
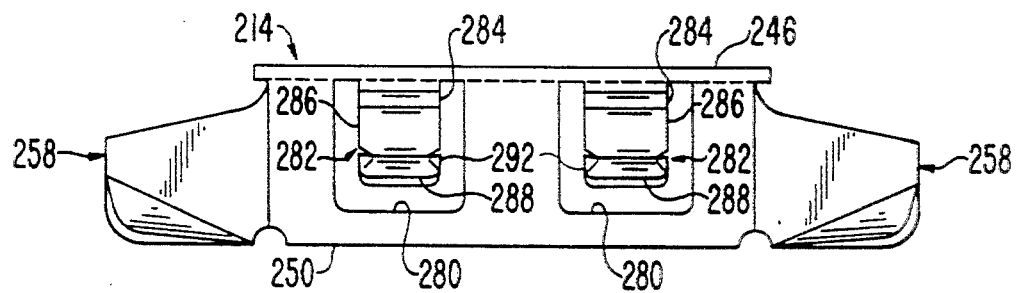
FIG. 11 is a side elevational view of the mounting bracket shown in FIG. 10.
Figure 12:
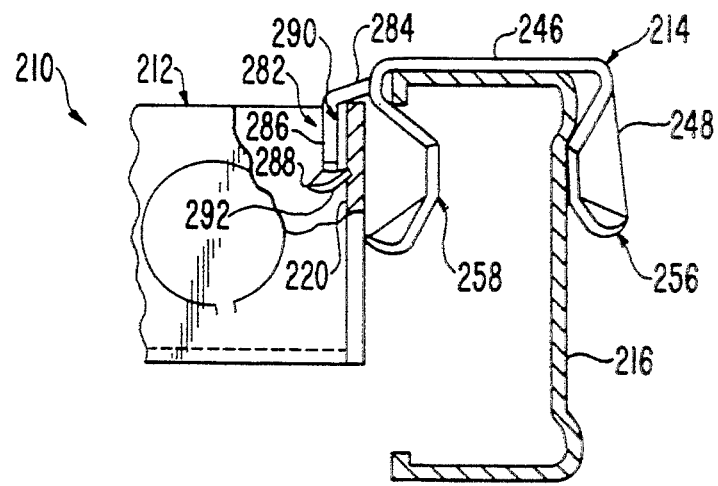
FIG. 12 is a partial, bottom plan view of the mounting bracket shown in FIGS. 10 and 11 coupled to an electrical box.

Third Embodiment of FIGS. 10–12

Referring now to FIGS. 1014 12, an electrical box assembly 210 is illustrated in accordance with a third embodiment of the present invention. As seen in FIG. 12, electrical box assembly 210 includes a housing or conventional electrical box 212 rigidly coupled to a mounting bracket 214. This embodiment permits mounting bracket 214 to be mounted on any conventional electrical box without the need of any tools or additional fasteners.

Housing 212 is substantially identical to housing 12 as shown in FIGS. 1 and 2. Therefore, housing 212 will not be discussed or illustrated in detail.

Mounting bracket 214 is substantially U-shaped with a base portion 246, a first leg portion 248 with arms 256, and a second leg portion 250 with arms 258. Mounting bracket 214 is substantially identical to mounting bracket 14 illustrated in FIGS. 1–6, except that mounting bracket 214 has been modified to be rigidly coupled to a conventional electrical box or housing 212 by clamping tabs 282, as discussed below, rather than by welds or rivets. Therefore, only the differences between mounting bracket 214 and mounting bracket 14 will be discussed in detail.

Mounting bracket 214 is preferably stamped and folded from a single sheet of metal to form an integral, unitary, one-piece bracket.

Second leg portion 250 has a pair of openings 280 stamped out of leg 250 to form a pair of clamping tabs 282. Clamping tabs 282 are resiliently coupled to leg 250 by connecting portions 284. Connecting portions 284 extend outwardly and downwardly from leg 250 to space clamping tabs 282 from leg 250 for receiving a side wall of housing 212 between the inner surfaces of the clamping tabs 282 and the outer surface of leg 250.

Each of the clamping tabs includes a base portion 286 extending downwardly from connecting portion 284 and inwardly towards leg 250, and a gripping portion 288 extending downwardly and outwardly from base portion 286.

Each base portion 286 is substantially planar and forms a space 290 between its inner surface and the outer surface of leg 250 to receive a side wall of housing 212 therein.

Gripping portion 288 has a pair of angled barbs 292 extending upwardly and inwardly from gripping portion 288 for engaging a side wall of an electrical box.

As seen in FIG. 12, mounting bracket 214 is rigidly coupled to housing 212 by clamping tabs 282. In particular, side wall 220 of housing 212 is slid into spaces 290 formed between leg 250 and clamping tabs 282 thereby causing clamping tabs 282 to be deflected outwardly from leg 250. The resiliency of connecting portions 284 and clamping tabs 282 cause clamping tabs 282 to apply a force inwardly against the side wall 220. Specifically, side wall 220 is clamped between leg 250 and clamping tabs 282 with angle barbs 292 engaging and digging into side wall 220. Thus, mounting bracket 214 is rigidly coupled to housing 214. Next, mounting bracket 214 can be mounted onto a support member 216 in substantially the same manner that mounting bracket 14 is coupled to support member 16 as discussed above.

Figure 13:
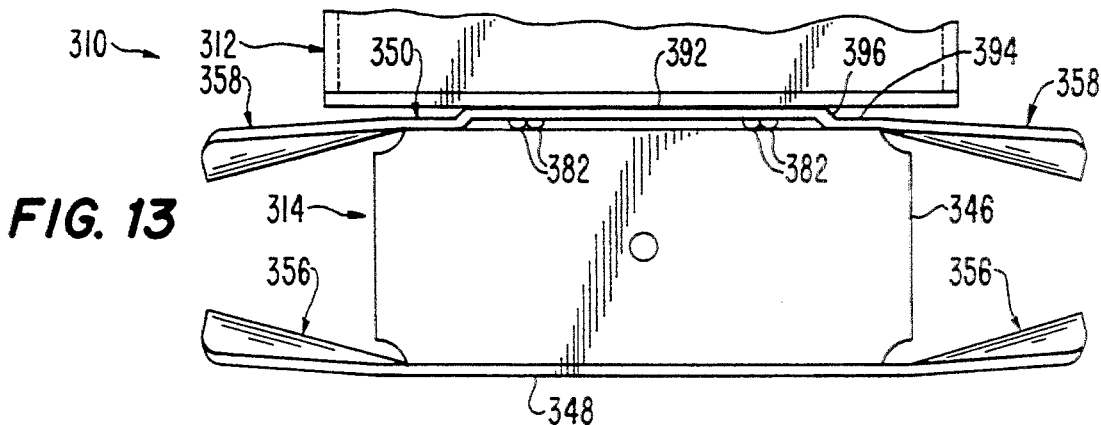
FIG. 13 is a partial, back elevational view of a fourth embodiment of an electrical box assembly with a mounting bracket in accordance with the present invention.
Figure 14:
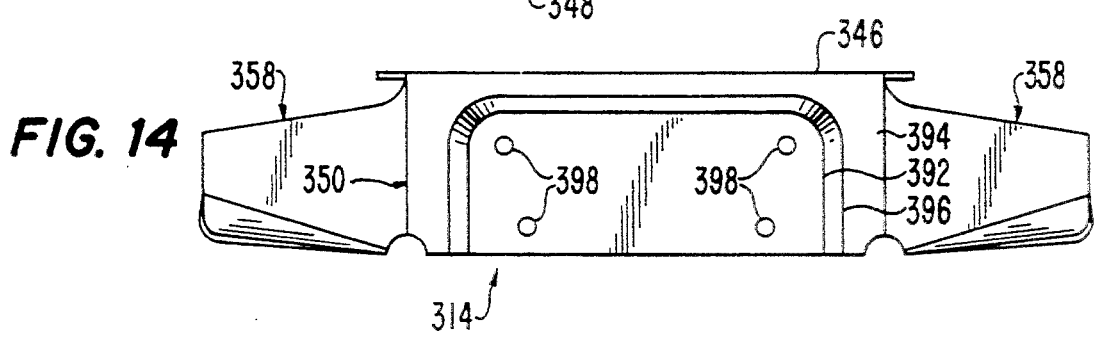
FIG. 14 is a side elevational view of the mounting bracket shown in FIG. 13 with the electrical box removed.

Fourth Embodiment of FIGS. 13 and 14

Referring now to FIGS. 13 and 14, an electrical box assembly 310 is illustrated in accordance with a fourth embodiment of the present invention. As seen in FIG. 13, electrical box assembly 310 includes a housing or conventional electrical box 312 rigidly coupled to a mounting bracket 314.

Housing 312 is substantially identical to housing 12 as shown in FIGS. 1 and 2. Therefore, housing 312 will not be discussed or illustrated in detail.

Mounting bracket 314 is substantially U-shaped with a base portion 346, a first leg portion 348 with arms 356, and a second leg portion 350 with arms 358. Mounting bracket 314 is substantially identical to mounting bracket 14 illustrated in FIGS. 1–6, except that mounting bracket 314 has been modified to be rigidly coupled to an electrical box or housing 312 by rivets 382, as discussed below, rather than by welds, and second leg portion 350 has been modified to have an offset portion 392. Therefore, only the differences between mounting bracket 314 and mounting bracket 14 will be discussed in detail.

Second leg portion 350 has an offset portion 392 bent outwardly from a main portion 394 of second leg portion 350. A transition portion 396 connects offset portion 392 to main portion 394 of second leg portion 350. Offset portion 392 is substantially flat and parallel to main portion 394. Preferably, offset portion 392 is spaced about 1/16 of an inch outwardly from main portion 394, and spaced about 9/64 of an inch away from the outer surface of base portion 346, to provide clearance for an outlet cover which is slightly larger than the outside dimensions of the electrical box.

Offset portion 392 can be provided with holes 398 for coupling mounting bracket 314 to electrical box 312 via rivets 382 or other suitable fasteners. Of course, offset portion 392 could be welded to electrical box 312.

Figure 15:
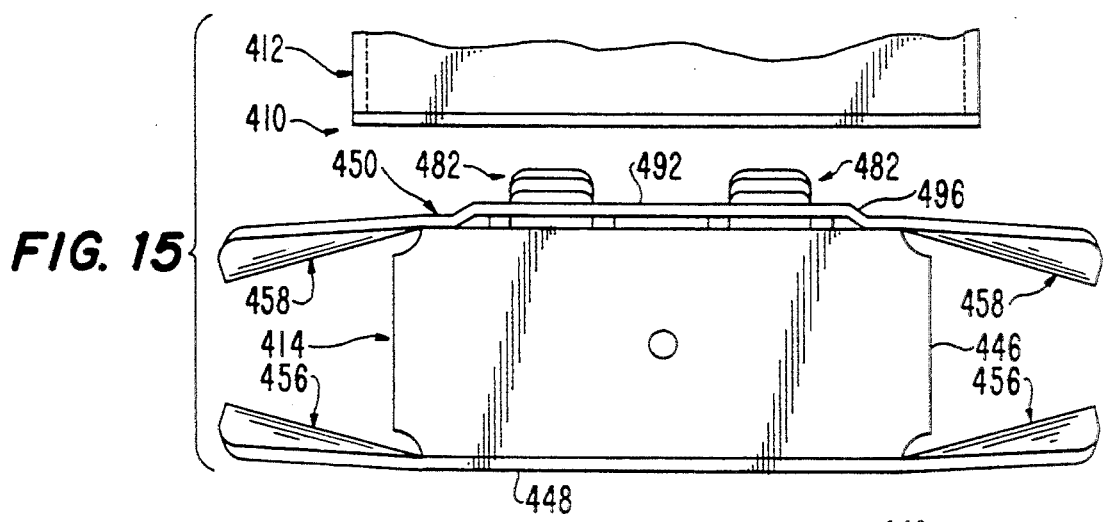
FIG. 15 is a partial, exploded, back elevational view of a fifth embodiment of a mounting bracket adapted to be mounted to an electrical box.
Figure 16:
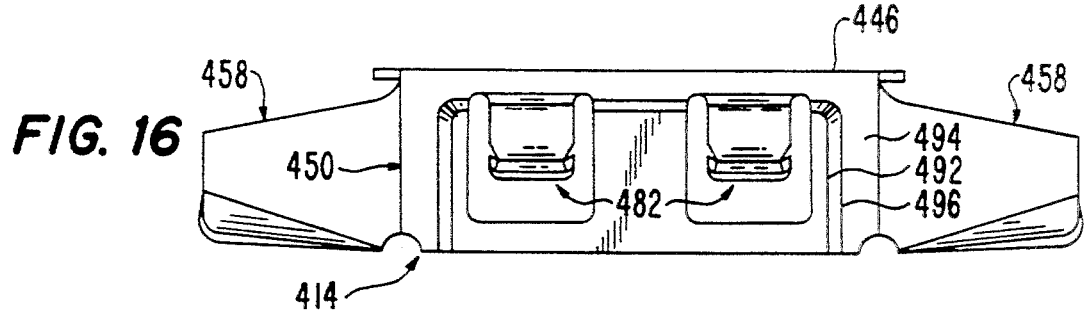
FIG. 16 is a side elevational view of the mounting bracket shown in FIG. 15.

Fifth Embodiment of FIGS. 15 and 16

Referring now to FIGS. 15 and 16, an electrical box assembly 410 is illustrated in accordance with a fifth embodiment of the present invention. As seen in FIG. 15, electrical box assembly 410 includes a housing or electrical box 412 adapted to be rigidly coupled to a mounting bracket 414. This embodiment permits mounting bracket 414 to be mounted on any conventional electrical box without the need of any tools or additional fasteners.

Housing 412 is substantially identical to housing 12 as shown in FIGS. 1 and 2. Therefore, housing 412 will not be discussed or illustrated in detail.

Mounting bracket 414 is substantially U-shaped with a base portion 446, a first leg portion 448 with arms 456, and a second leg portion 450 with arms 458. Mounting bracket 414 is substantially identical to mounting bracket 214 illustrated in FIGS. 10–12, except that second leg portion 450 of mounting bracket 414 has been modified to have an offset portion 492 as discussed below. Therefore, only the differences between mounting bracket 414 and mounting bracket 214 will be discussed in detail.

Second leg portion 450 has an offset portion 492 bent outwardly from a main portion 494 of second leg portion 450. A transition portion 496 connects offset portion 492 to main portion 494 of second leg portion 450. Offset portion 492 is substantially flat and parallel to main portion 494. Preferably, offset portion 492 is spaced about 1/16 of an inch outwardly from main portion 494, and spaced about 9/64 of an inch away from the outer surface of base portion 446 to provide clearance for an outlet cover which is slightly larger than the outside dimensions of the electrical box.

Offset portion 492 is provided with a pair of clamping tabs 482 for securely coupling mounting bracket 414 to electrical box 412. Clamping tabs 482 are substantially identical to clamping tabs 282, and thus will not be discussed in detail herein.

Sixth Embodiment of FIGS. 17–22

Mounting bracket 514 is preferably formed as a one-piece, unitary member from spring steel or any other suitable resilient material. Alternatively, mounting bracket 514 can be formed as a one-piece, unitary, integrally molded member from a suitable non-metallic material, such as thermoplastic.

Figure 21:
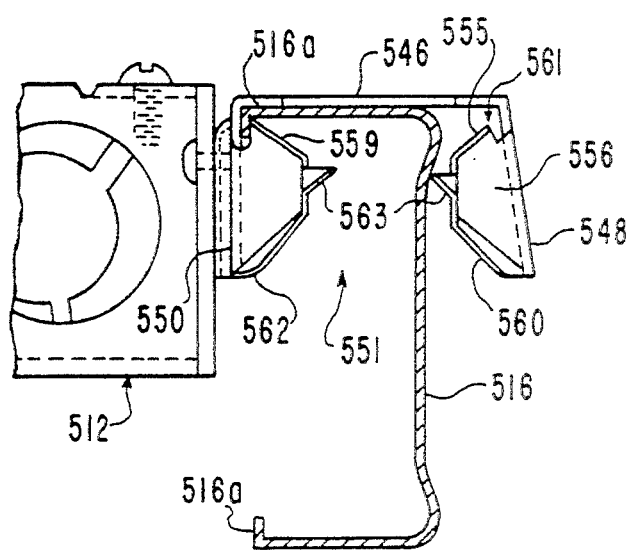
FIG. 21 is a partial, bottom plan view of the mounting bracket shown in FIGS. 17-20 mounted on a conventional metal stud.

Housing 512 is preferably fixedly and rigidly coupled to mounting bracket 514 by riveting, as seen in FIG. 21, or by other suitable fastening means. As particularly seen in FIG. 19, mounting bracket 514 is substantially U-shaped with a base portion 546, a first leg portion 548, and a second leg portion 550. Preferably, mounting bracket 514 is formed by stamping a piece of sheet metal into a blank, as seen in FIG. 20, and then bending the blank along the broken lines to its final shape as particularly seen in FIGS. 17–19.

Base portion 546 is a substantially flat, rectangular plate with a centrally located mounting or pilot hole 564 and with its four corners removed. Leg portions 548 and 550 extend substantially perpendicularly from the two long, longitudinal sides of base portion 546. Accordingly, leg portions 548 and 550 are substantially parallel to each other and form a space 551 therebetween for receiving support member 516. Preferably, the distance between leg portions 548 and 550 is approximately 1½ inches to accommodate either metal or wood support members, i.e., studs or Joists.

Leg portions 548 and 550 are substantially identical in construction, except that second leg portion 550 has a raised portion 552 and is a mirror image of first leg portion 548.

As seen in FIGS. 17–21, first leg portion 548 is a substantially flat, rectangular plate with an inwardly surface and an outwardly facing surface. An inwardly angled arm 556 extends inwardly from each of the short ends of first leg portion 548 into space 551. Each of the inwardly angled arms 556 has upper edge 555 and an outwardly extending wing 560 along the lower portion of arm 556.

A slot or notch 561 is formed between each of the short ends of first leg portion 548 and upper edges 555 of arms 556 for receiving flange 516a of support member 516. In particular, slots 561 are sufficiently larger in depth than the length of flange 516a of support member 516 to allow flange 516a to easily enter slots 561. Each of the slots 561 is preferably substantially U-shaped with a pair of gripping edges or portions 561a and 561b. Gripping edges 561a are formed along the inner surface or edge of the respective short ends of first leg portion 548, while gripping edges 561b are formed along the outer surface or edge of arms 556.

Gripping edges 561b are spaced laterally inwardly from gripping edges 561a towards the center of space 551 since gripping edges 561b are formed on the inwardly angled arms 556. In other words, gripping edges 561a lie in a first plane formed along the inner surface of first leg portion 548, while gripping edges 561b lie in a second plane which is angled slightly inwardly, but essentially substantially parallel to the first plane of gripping edges 561a. The distance between the first plane of gripping edges 561a and the second plane of gripping edges 561b is slightly less than the thickness of flange 516a of support member 516, i.e., about one-sixty fourth of an inch.

Accordingly, when mounting bracket 514 is mounted on support member 516, flange 516a of support member 516 will be positioned in slots 561 with gripping forces being applied to flange 516a by gripping edges 561a and 561b. In particular, the resiliency of the material of bracket 514 will cause gripping edges 561a and gripping edges 561b to apply oppositely directed forces on flange 516a to firmly secure bracket 514 to support member 516. Depending on the material, i.e., thickness and hardness, of support member 516, the forces applied by gripping edges 561a and gripping edges 561b may cause flange 516a to bend or crimp.

Arms 556 may also be provided with a sharp gripping tooth 563 to provide additional gripping strength. Teeth 563 are particularly useful when bracket 514 is mounted on a wood stud. Each tooth 563 is located along upper edge 555 at the free end of the respective arm 556. Tooth 563 is angled inwardly towards space 551 to engage the side of support member 516.

Second leg portion 550 is a substantially flat, rectangular plate with an inwardly facing surface and an outwardly facing surface. An inwardly angled arm 558 extends inwardly from each of the short ends of second leg portion 550 into space 551. Each of the inwardly angled arms 558 has an upper edge 559 and an outwardly extending wing 562 along the lower portion of arm 558.

Second leg 550 and arms 558 will not be discussed in detail, since second leg portion 550 and arms 558 are substantially identical in construction to first leg portion 548 and arms 556, respectively.

Figure 22:
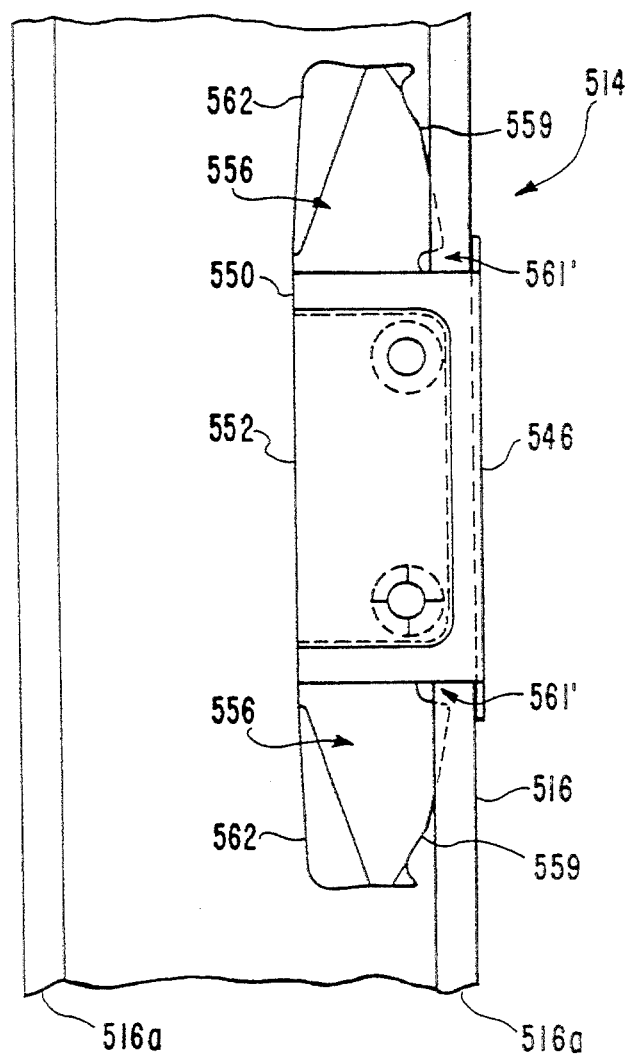
FIG. 22 is a partial, side elevational view of the mounting bracket shown in FIGS. 17-21 mounted on a conventional metal stud with the electrical box removed.

As particularly seen in FIGS. 21 and 22, a slot or notch 561' is formed between each of the short ends of second leg portion 550 and upper edges 559 of arms 558 for receiving flange 516a of support member 516. In particular, slots 561' is sufficiently larger in depth than the length of flange 516a of support member 516 to allow flange 516a to easily enter slots 561'. Each of the slots 561' is preferably substantially U-shaped with a pair of gripping edges or portions 561c and 561d. Gripping edges 561c are formed along the inner surface or edge of the respective short ends of second leg portion 550, while gripping edges 561d are formed along the outer surface or edge of arms 558.

Gripping edges 561d are spaced laterally inwardly from gripping edges 561c towards the center of space 551 since gripping edges 561d are formed on the inwardly angled arms 558. In other words, gripping edges 561c lie in a third plane formed along the inner surface of first leg portion 550, while gripping edges 561d lie in a fourth plane which is angled slightly inwardly, but essentially substantially parallel to the third plane of gripping edges 561c. The distance between the first plane of gripping edges 561c and the second plane of gripping edges 561d is slightly less than the thickness of flange 516a of support member 516, i.e., about one-sixty fourth of an inch.

Accordingly, when mounting bracket 514 is mounted on support member 516, flange 516a of support member 516 will be positioned in slots 561' with gripping forces being applied to flange 516a by gripping edges 561c and 561d. In particular, the resiliency of the material of bracket 514 will cause gripping edges 561c and gripping edges 561d to apply oppositely directed forces on flange 516a to firmly secure bracket 514 to support member 516. Depending on the material, i.e., thickness and hardness, of support member 516, the forces applied by gripping edges 561c and gripping edges 561d may cause flange 516a to bend or crimp.

As seen in FIG. 21, first leg portion 548 and second leg portion 550 are resiliently coupled to the base portion 546 to exert pressure on support member 516 for securely gripping support member 516. This pressure is accomplished by ensuring that the space between the free ends of arms 556 and 558 is less than the cross-sectional thickness of metal stud 516.

As specifically seen in FIGS. 17-19, outwardly extending wings 560 and 562, respectively, extend outwardly at an angle of approximately 30° from each of the inwardly angled arms. Outwardly extending wings 560 and 562 serve as ramps to bias leg portions 548 and 550 outwardly along with arms 556 and 558 to receive metal stud 516 into space 551.

As seen in FIG. 18, pilot hole 564 is located in the center of base portion 546 which can receive an optional mounting screw or other suitable fastener to further secure mounting bracket 514 to metal stud 516, if desired.

As mentioned above, bracket 514 can be used on a wood stud or joist. Upon mounting bracket 514 on a wood stud or joist, inwardly angled arms 556 and 558 will resiliently grip the wood stud or joist. Arms 556 and 558 prevent longitudinal movement of box 510 along the stud or joist, since the teeth 563 will dig into the wood upon attempting longitudinal movement.

Figure 23:
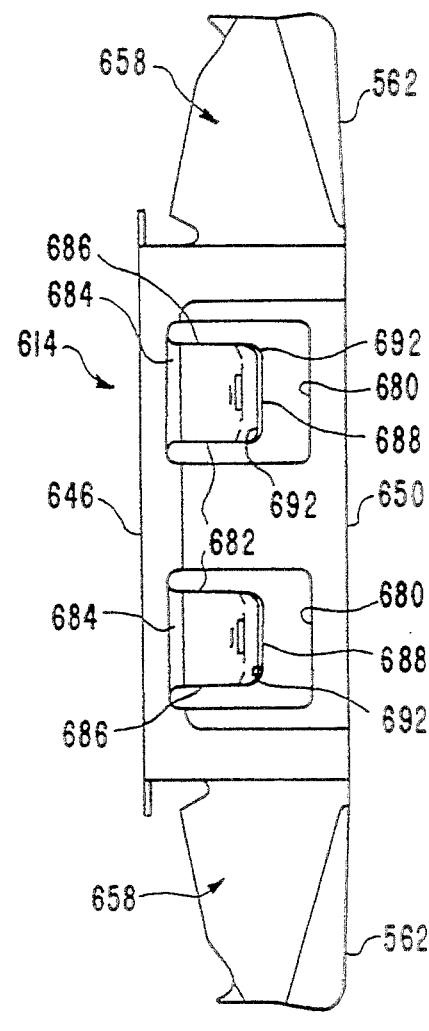
FIG. 23 is a side elevational view of a seventh mounting bracket in accordance with the present invention.

Seventh Embodiment of FIG. 23

Referring now to FIG. 23, a mounting bracket 614 in accordance with a seventh embodiment of the invention is illustrated and includes a base portion 646, a first leg portion with arms (not illustrated), and a second leg portion 650 with arms 658.

Mounting bracket 614 is substantially identical to mounting bracket 514 illustrated in FIGS. 17-22, except that mounting bracket 614 has been modified to be rigidly coupled to a conventional electrical box or housing by clamping tabs 682, as discussed below, rather than by rivets. Therefore, only the differences between mounting bracket 614 and mounting bracket 514 will be discussed in detail.

Mounting bracket 614 is preferably stamped and folded from a single sheet of metal to form an integral, unitary, one-piece bracket. This embodiment permits mounting bracket 614 to be mounted on any conventional electrical box without the need of any tools or additional fasteners.

Second leg portion 650 has a pair of openings 680 stamped out of leg 650 to form a pair of clamping tabs 682. Clamping tabs 682 are resiliently coupled to leg 650 by connecting portions 684. Connecting portions 684 extend outwardly and downwardly from leg 650 to space clamping tabs 682 from leg 650 for receiving a side wall of housing (not shown) between the inner surfaces of the clamping tabs 682 and the outer surface of leg 650.

Each of the clamping tabs includes a base portion 686 extending downwardly from connecting portion 684 and inwardly towards leg 650, and a gripping portion 688 extending downwardly and outwardly from base portion 686.

Each base portion 686 is substantially planar and forms a space between its inner surface and the outer surface of leg 650 to receive a side wall of a housing or electrical box (not shown) therein.

Gripping portion 688 has a pair of angled barbs 692 extending upwardly and inwardly from gripping portion 688 for engaging a side wall of an electrical box.

While several embodiments have been chosen to illustrate the invention, it will be understood by those skilled in the art that various changes and modifications can be made herein without departing from the scope of the invention as defined in the appended claims.

What is claimed is:

1. An electrical box assembly adapted to be mounted to a support member, comprising:
    an electrical housing;
    a substantially U-shaped bracket for supporting said housing on the support member, said bracket including
    a substantially flat base portion,
    a first leg portion coupled substantially perpendicular to said base portion,
    a second leg portion coupled substantially perpendicular to said base portion to form a space for receiving the support member between said first and second leg portions,
    a pair of first arms coupled to opposite ends of said first leg portion with each of said first arms being bent about a fold line extending substantially perpendicular to said base portion so that said first arms extend inwardly into the space formed by said first and second leg portions for resiliently gripping the support member, and a pair of second arms coupled to opposite ends of said second leg portion with each of said second arms being bent about a fold line extending substantially perpendicular to said base portion so that said second arms extend inwardly into the space formed by said first and second leg portions for resiliently gripping the support member; and coupling means for rigidly coupling said bracket to said housing.

2. An electrical box assembly according to claim 1, wherein
said coupling means includes at least one weld between said bracket and said housing.

3. An electrical box assembly according to claim 2, wherein
said second leg portion includes a plurality of embosses for welding said second leg portion to said housing.

4. An electrical box assembly according to claim 1, wherein
said coupling means includes at least one rivet coupling said bracket to said housing.

5. An electrical box assembly according to claim 1, wherein
said second leg portion includes a main portion and an offset portion spaced outwardly from said main portion of said second leg portion.

6. An electrical box assembly according to claim 1, wherein
said base portion includes a hole for receiving a conventional fastener to fixedly secure said bracket to the support member.

7. An electrical box assembly according to claim 1, wherein
each of said arms includes an edge extending downwardly away from its respective said leg portion to form a wedge-shaped space between the plane of said base portion and said edge.

8. An electrical box assembly according to claim 1, wherein
each of said arms having a first arm portion extending outwardly from its respective said leg portion, a second arm portion angled inwardly from said first arm portion, and a third arm portion angled inwardly from said second arm portion.

9. An electrical box assembly according to claim 8, wherein
each of said third arm portions includes an outwardly extending wing.

10. An electrical box assembly according to claim 8, wherein
each of said inwardly angled arms and each of said third arm portions includes gripping teeth for engaging said supporting member.

11. An electrical box assembly according to claim 10, wherein
each of said arms includes an edge extending downwardly away from its respective said leg portion to form a wedge-shaped space between the plane of said base portion and said edge.

12. An electrical box assembly according to claim 1, wherein
said bracket means is formed from spring steel.

13. An electrical box assembly according to claim 1, wherein
each of said arms has an inwardly extending gripping tooth.

14. An electrical box assembly adapted to be mounted to a support member, comprising:
an electrical housing;
a substantially U-shaped bracket for supporting said housing on the support member, said bracket including
a substantially flat base portion,
a first leg portion coupled substantially perpendicular to said base portion,
a second leg portion coupled substantially perpendicular to said base portion to form a space for receiving the support member between said first and second leg portions,
a first pair of arms coupled to opposite ends of said first leg portion and angled inwardly into the space formed by said first and second leg portions for resiliently gripping the support member, and
a second pair of arms coupled to opposite ends of said second leg portion and angled inwardly into the space formed by said first and second leg portions for resiliently gripping the support member,
each of said inwardly angled arms including an outwardly extending wing and an edge extending downwardly away from its respective said leg portion to form a wedge-shaped space between the plane of said base portion and said edge; and
coupling means for rigidly coupling said bracket to said housing.

15. A mounting bracket assembly adapted to be coupled to an electrical box, comprising:
a substantially flat base portion;
a first leg portion coupled substantially perpendicular to said base portion;
a second leg portion coupled substantially perpendicular to said base portion to form a space for receiving a support member between said first and second leg portions;
a pair of first arms coupled to opposite ends of said first leg portion for resiliently gripping the support member with each of said first arms being bent about a fold line extending substantially perpendicular to said base portion so that said first arms extend inwardly toward said second leg portion;
a pair of second arms coupled to opposite ends of said second leg portion for resiliently gripping the support member with each of said second arms being bent about a fold line extending substantially perpendicular to said base portion so that said second arms extend inwardly toward said first leg portion; and
coupling means for rigidly coupling said bracket to an electrical box.

16. A mounting bracket assembly according to claim 15, wherein
said coupling means includes at least one clamping tab extending from said first leg portion to form a space between said clamping tab and said first leg portion for receiving a side wall of an electrical box therein.

17. A mounting bracket assembly according to claim 16, wherein said base portion includes a hole for receiving a conventional fastener to fixedly secure said bracket to the support member.

18. A mounting bracket assembly according to claim 16, wherein
each of said arms includes an edge extending downwardly away from its respective said leg portion to form a wedge-shaped space between the plane of said base portion and said edge.

19. A mounting box assembly according to claim 15, wherein
each of said arms includes an edge extending downwardly away from its respective said leg portion to form a wedge-shaped space between the plane of said base portion and said edge.

20. A mounting bracket assembly according to claim 15, wherein
said second leg portion includes a main portion and an offset portion spaced outwardly from said main portion of said second leg portion.

21. A mounting bracket assembly according to claim 15, wherein
each of said first and second arms has an inwardly extending gripping tooth.

22. A mounting bracket assembly adapted to be coupled to an electrical box, comprising:
a substantially flat base portion;
a first leg portion coupled substantially perpendicular to said base portion;
a second leg portion coupled substantially perpendicular to said base portion to form a space for receiving a support member between said first and second leg portions;
a first pair of arms coupled to opposite ends of said first leg portion for resiliently gripping the support member with said first arms being angled inwardly toward said second leg portion;
a second pair of arms coupled to opposite ends of said second leg portion for resiliently gripping the support member with said second arms being angled inwardly toward said first leg portion, each of said inwardly angled arms including an outwardly extending wing and an edge extending downwardly away from its respective said leg portion to form a wedge-shaped space between the plane of said base portion and said edge; and
coupling means for rigidly coupling said bracket to an electrical, said coupling means including at least one clamping tab extending from said first leg portion to form a space between said clamping tab and said first leg portion for receiving a side wall of an electrical box therein.

23. A mounting bracket assembly adapted to be coupled to an electrical box and mounted on a support member, comprising:
a substantially flat base portion;
a first leg portion coupled substantially perpendicular to said base portion, said first leg portion having an inwardly facing surface with a first leg gripping portion lying in a first plane and an outwardly facing surface;
a second leg portion coupled substantially perpendicular to said base to form a space with said base portion and said first leg portion for receiving a support member between said first and second leg portions, said second leg portion having an inwardly facing surface and an outwardly facing surface;
a first arm coupled to one end of said first leg portion for forming a first gripping slot between said first arm and said one end of said first leg portion for resiliently gripping the support member, said first arm having a first arm gripping portion lying in a second plane and forming said first gripping slot between said first and second planes of said gripping portions to receive and grip a flange of the support member therein; and
coupling means for rigidly coupling said bracket to an electrical box.

24. A mounting bracket assembly according to claim 23, wherein
said first and second planes are spaced apart about one-sixty fourth of an inch to slightly crimp the flange of the support member received in said slot.

25. A mounting bracket assembly according to claim 23, wherein
said first leg portion further includes a second arm coupled to the other end of said first leg portion, said second arm has a second arm gripping portion lying in a third plane and forming a second gripping slot between said first and third planes to receive and grip the flange of support member therein.

26. A mounting bracket assembly according to claim 25, wherein
said second and third planes lie in the same plane.

27. A mounting bracket assembly according to claim 25, wherein
said inwardly facing surface of said second leg portion further includes a second leg gripping portion lying in a fourth plane, and a first arm coupled to one end of said second leg portion for resiliently gripping the support, said first arm of said second leg portion has a third arm gripping portion lying in a fifth plane and forming a third gripping slot between said fourth and fifth planes to selectively receive and grip the flange of the support member therein.

28. A mounting bracket assembly according to claim 27, wherein
said second leg portion further includes a second arm coupled to the other end of said second leg portion, said second arm of said second leg portion has a fourth arm gripping portion lying in a sixth plane and forming a fourth gripping slot between said fourth and sixth planes to selectively receive and grip the flange of the support member therein.

29. A mounting bracket assembly according to claim 28, wherein
said first and second arms of each of said leg portions extend inwardly therefrom.

30. A mounting bracket assembly according to claim 29, wherein each of said first and second arms of each of said leg portions includes an outwardly extending wing.

31. A mounting bracket assembly according to claim 28, wherein
said coupling means includes at least one clamping tab extending from said leg portion to form a space between said clamping tab and said first leg portion for receiving a side wall of an electrical box therein.

32. A mounting bracket assembly according to claim 28, wherein
said coupling means includes at least one hole formed in one of said leg portions for receiving a fastener to couple a side wall of an electrical box thereto.

33. A mounting bracket assembly according to claim 28, wherein
each of said first and second arms has an inwardly extending gripping tooth.

34. A mounting bracket assembly according to claim 23, wherein
said second leg portion includes a main portion and an offset portion spaced outwardly from said main portion of said second leg portion.

35. A mounting bracket assembly adapted to be coupled to an electrical box and mounted on a support member, comprising;
a substantially flat base portion with an inwardly facing surface lying in a first plane for contacting a surface of the support;
a first leg portion coupled substantially perpendicular to said base portion;
a second leg portion coupled substantially perpendicular to said base portion to form a space with said base portion and said first leg portion for receiving the support member between said first and second leg portions;
a first arm coupled to one end of said first leg portion for resiliently gripping the support member, said first arm having a gripping edge lying in a second plane to form a first wedge-shaped gripping slot between said first and second planes for receiving and gripping a flange of the support member;
a second arm coupled to the other end of said first leg portion for resiliently gripping the support member, said second arm having a gripping edge lying in a third plane for forming a second wedge-shaped gripping slot between said first and third planes to receive the flange of the support member therein; and
coupling means for rigidly coupling said bracket to an electrical box.

36. A mounting bracket assembly according to claim 35, wherein
said second leg portion further includes a first arm coupled to one end of said second leg portion for resiliently gripping the support member, said first arm of said second leg portion having a gripping portion lying in a fourth plane for forming a third slot between said first and fourth planes to selectively receive the flange of the support member therein.

37. A mounting bracket assembly according to claim 36, wherein
said gripping portion of said first arm of said second leg portion is formed by an edge extending downwardly away from said second leg portion so that said third slot is substantially wedge-shaped between said first and fourth planes.

38. A mounting bracket assembly according to claim 37, wherein
said second leg portion further includes a second arm coupled to the other end of said second leg portion for resiliently gripping the support member, said second arm of said second leg portion has a gripping portion lying in a fifth plane for forming a fourth slot between said first and fifth planes to selectively receive the flange of the support member therein.

39. A mounting bracket assembly according to claim 38, wherein
said gripping portion of said second arm of said second leg is formed by an edge extending downwardly away from said second leg portion so that said fourth slot is substantially wedge-shaped between said first and fifth planes.

40. A mounting bracket assembly according to claim 39, wherein
said first and second arms of each of said leg portions extend inwardly therefrom.

41. A mounting bracket assembly according to claim 39, wherein
said coupling means includes at least one clamping tab extending from said leg portion to form a space between said clamping tab and said first leg portion for receiving a side wall of an electrical box therein.

42. A mounting bracket assembly according to claim 39, wherein
said coupling means includes at least one hole formed in one of said leg portions for receiving a fastener to couple a side wall of an electrical box thereto.

43. A mounting bracket assembly according to claim 39, wherein
each of said first and second arms has an inwardly extending gripping tooth.

44. A mounting bracket assembly according to claim 39, wherein
said second leg portion includes a main portion and an offset portion spaced outwardly from said main portion of said second leg portion.

45. A mounting bracket assembly adapted to be coupled to an electrical box and mounted on a support member, comprising;
a substantially flat base portion with an inwardly facing surface lying in a first plane for contacting a surface of the support;
a first leg portion coupled substantially perpendicular to said base portion;
a second leg portion coupled substantially perpendicular to said base portion to form a space with said base portion and said first leg portion for receiving the support member between said first and second leg portions;
a first arm coupled to one end of said first leg portion for resiliently gripping the support member, said first arm having a gripping portion lying in a second plane to form a first slot between said first and second planes for receiving and gripping a flange of the support member;
a second arm coupled to the other end of said first leg portion for resiliently gripping the support member, said second arm having a gripping portion lying in a third plane for forming a second slot between said first and third planes to receive the flange of the support member therein, said gripping portion of said second arm being formed by an edge extending downwardly away from said first leg portion so that said second slot is substantially wedge-shaped between said first and third planes;
a third arm coupled to one end of said second leg portion for resiliently gripping the support member, said third arm of said second leg portion having a gripping portion lying in a fourth plane for forming a third slot between said first and fourth planes to selectively received the flange of the support member therein, said gripping portion of said third arm of said second leg portion being formed by an edge extending downwardly away from said second leg portion so that said third slot is substantially wedge-shaped between said first and fourth planes;

a fourth arm coupled to the other end of said second leg portion for resiliently gripping the support member, said fourth arm of said second leg portion having a gripping portion lying in a fifth plane for forming a fourth slot between said first and fifth planes to selectively receive the flange of the support member therein, said gripping portion of said fourth arm of said second leg being formed by an edge extending downwardly away from said second leg portion so that said fourth slot is substantially wedge-shaped between said first and fifth planes;

said first, second, third and fourth arms of each of said leg portions extending inwardly therefrom and each of said first, second, third and fourth arms of each of said leg portions including an outwardly extending wing; and coupling means for rigidly coupling said bracket to an electrical box.

* * * * *